June 14, 1932.  F. H. RAGAN  1,863,282
BRAKE OPERATING MECHANISM
Filed June 25, 1928   3 Sheets-Sheet 1
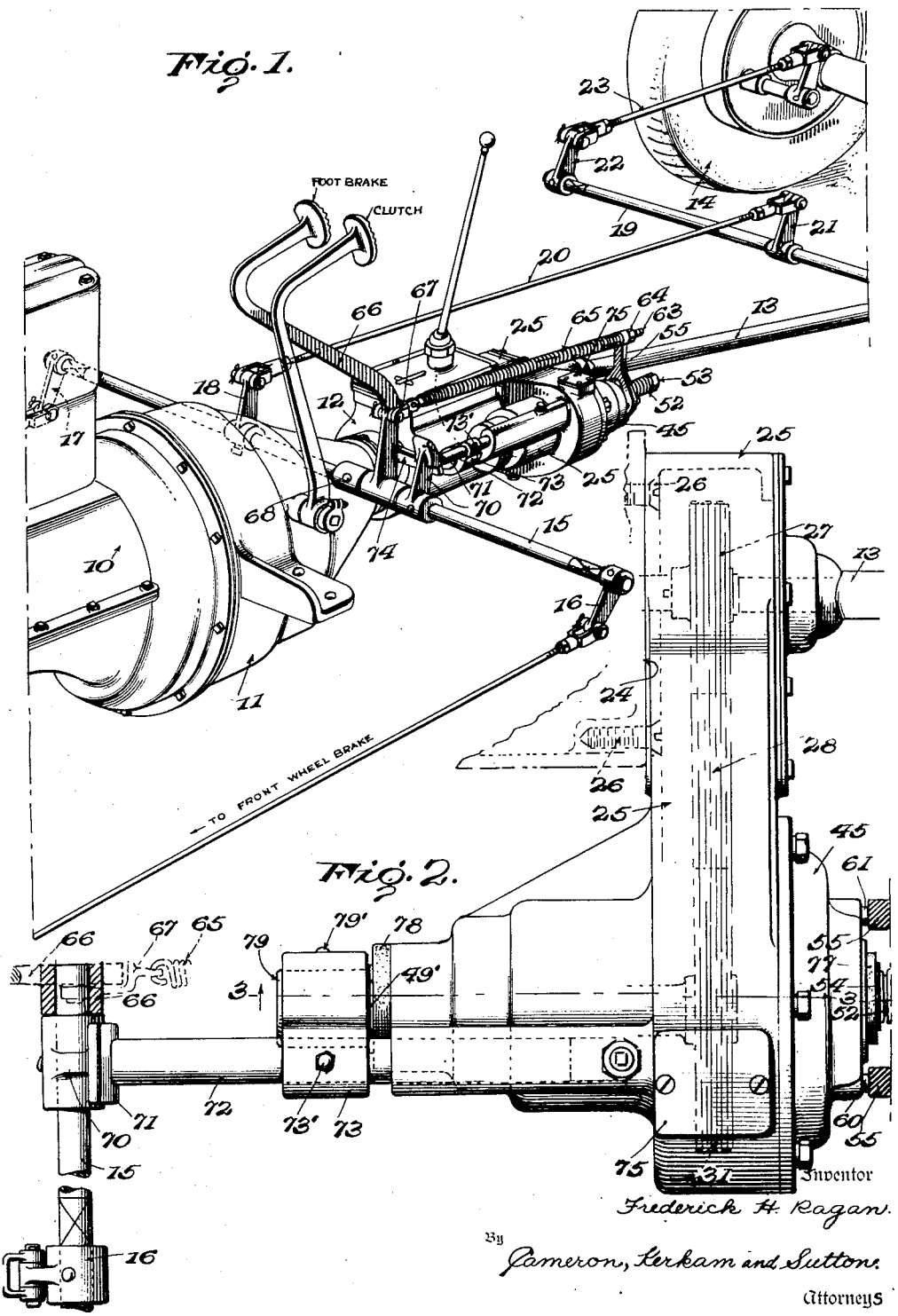

June 14, 1932.  F. H. RAGAN  1,863,282

BRAKE OPERATING MECHANISM

Filed June 25, 1928  3 Sheets-Sheet 2

Inventor
Frederick H. Ragan.
By Cameron, Kerkam and Sutton.
Attorneys

June 14, 1932.  F. H. RAGAN  1,863,282

BRAKE OPERATING MECHANISM

Filed June 25, 1928   3 Sheets-Sheet 3

OFF POSITION

BRAKING — FORWARD

BRAKING — REVERSE

Inventor
Frederick H. Ragan.
By Cameron, Kerkam and Sutton.
Attorneys

Patented June 14, 1932

1,863,282

UNITED STATES PATENT OFFICE

FREDERICK HATHAWAY RAGAN, OF CLEVELAND, OHIO

BRAKE OPERATING MECHANISM

Application filed June 25, 1928. Serial No. 288,148.

This invention relates to brake mechanism for automobiles, and more particularly to a power brake operating mechanism in which the brake applying force is derived from the motion of the vehicle, and in which the application of such forces is at all times under the complete control of the operator.

An object of the present invention is to provide such a device which is compact and powerful and is susceptible to accurate and positive control by the operator.

Another object is to provide such a device which will operate equally well whether the car is going forward or backward.

Another object is to provide such a device which is small and compact, but which provides large bearing surfaces for all force transmitting parts, so that lost motion will not develop during long periods of operation.

Another object of the invention is the provision of such a device which may be readily applied to existing types of vehicles.

Another object is the provision of such a device in which the brake applying forces exerted by the unit are transmitted through a strong and rigid connection to the chassis of the vehicle.

Other objects and advantages of the device will be in part obvious, and will become apparent to those skilled in the art through the following description taken in connection with the disclosure in the accompanying drawings which illustrate a preferred embodiment of the invention.

In the drawings—

Fig. 1 is a perspective view of the driving and braking units of an automobile with the power brake mechanism in assembled relation therewith;

Fig. 2 is an enlarged plan view of the brake operating mechanism;

Figure 5:
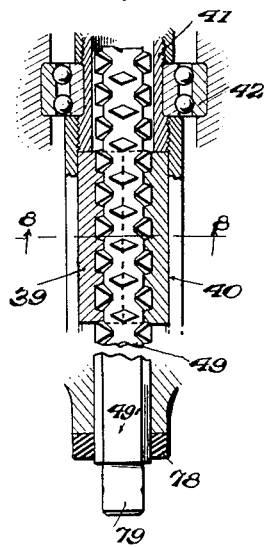
Figs. 5, 6 and 7 are details of the operating elements of the mechanism in various operative positions thereof.
Figure 6:
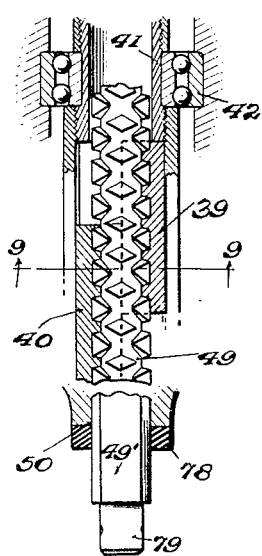
Figure 7:
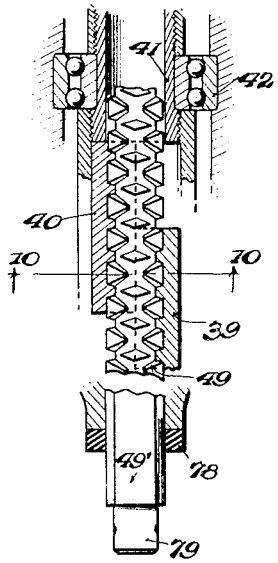
Figure 8:
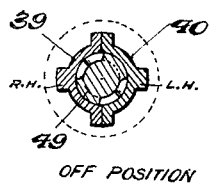
Figure 9:
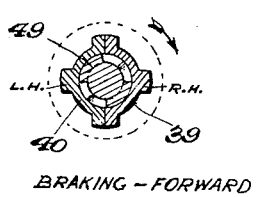
Figure 10:
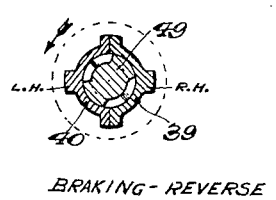
Figure 11:
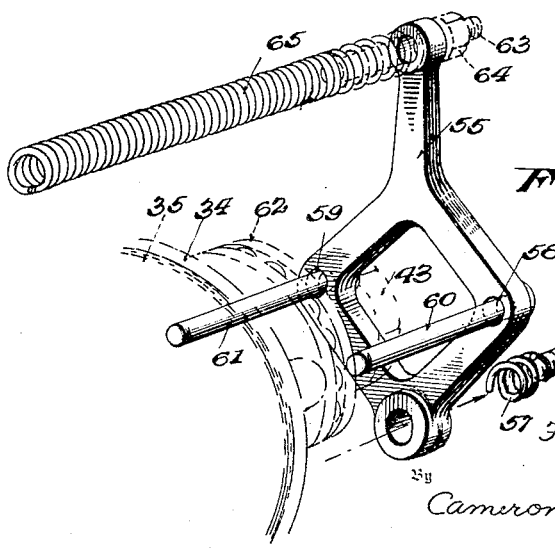

Figs. 8, 9 and 10 are sections through Figs. 5, 6 and 7 on lines 8—8, 9—9 and 10—10 respectively; and Fig. 11 is a perspective view of certain of the controlling elements of the brake operating mechanism.

Referring to the drawings, 10 indicates generally an internal combustion engine having a flywheel and clutch housing 11 operatively connected to a change speed transmission casing 12, and a shaft 13 arranged to drive the rear wheels, one of which is shown at 14, all these parts being arranged according to conventional automotive practice. A cross shaft 15 is suitably journaled in the side frame members, not shown, of the vehicle and carries at its outer ends a pair of crank elements 16 and 17 for operating the front wheel brakes of the vehicle. A crank arm 18 is also suitably fixed to the cross shaft 15 at an intermediate portion thereof and is adapted to operate a second cross shaft 19 located rearwardly thereof by means of a link 20 and crank arm 21 suitably attached to the cross shaft 19. Cross shaft 19 is adapted to operate the rear wheel brakes by means of cranks and links, one of each being shown at 22 and 23 respectively. The brake operating mechanism so far described is conventional in character and any other suitable form of connecting means may be substituted whereby oscillation of the cross shaft 15 will operate the vehicle brakes.

Figure 3:
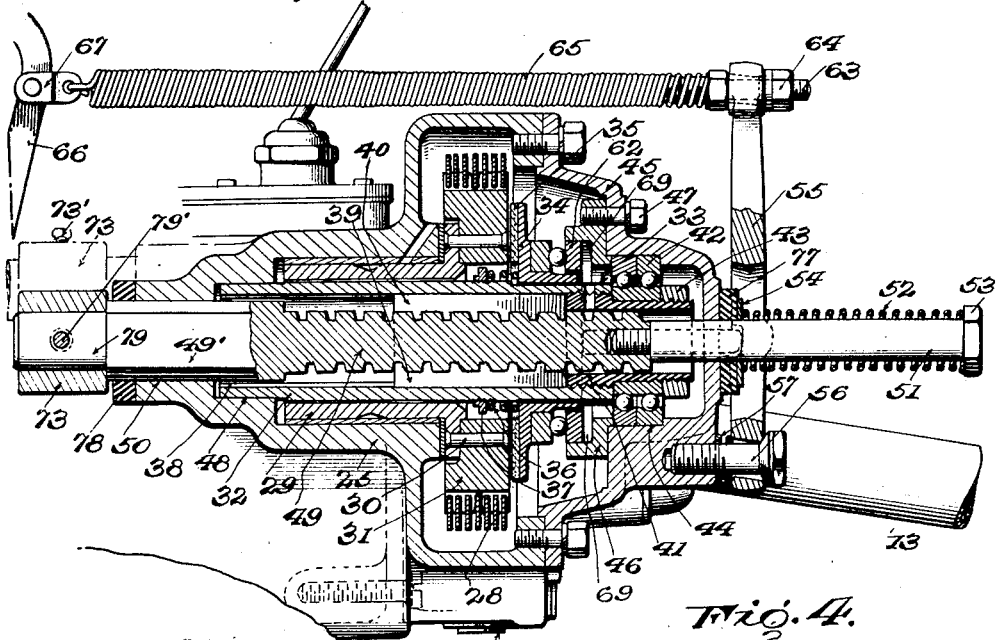
Fig. 3 is a vertical section taken approximately on the line 3—3 of Fig. 2.
Figure 4:
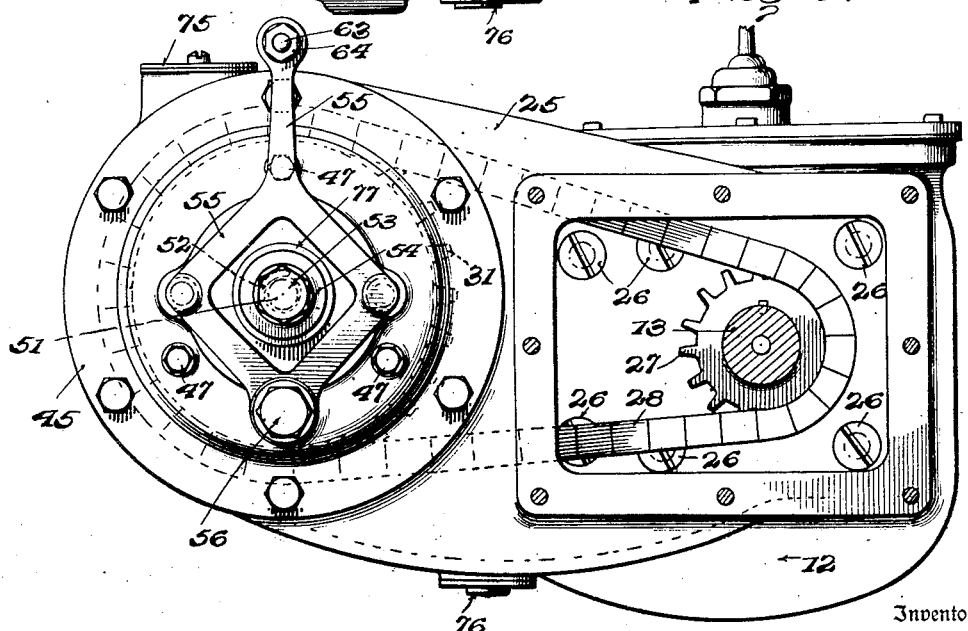
Fig. 4 is a rear end view of the operating mechanism.

According to the present invention the rear end of the transmission casing 12 is provided with a plane attaching surface 24 (Fig. 2) and an auxiliary housing 25 is fixed thereto by any suitable form of attaching means such as the screws 26. Drive shaft 13 extends through the housing 25 and has suitably keyed thereon within said housing a driving sprocket 27 (Fig. 4) which is adapted to cooperate with a chain 28 to actuate the power brake operating mechanism. As illustrated in Fig. 3, the power brake operating mechanism includes a hollow tubular shaft 29 suitably journaled within the housing 25, and said shaft has attached thereto in any suitable manner, as by means of the rivets 30, a power member in the form of a sprocket 31 adapted to cooperate with and be driven by chain 28. A second tubular shaft 32 extends through the hollow shaft 29 preferably out of contact therewith, and is suitably journaled at its forward end in a bearing 48 in the housing 25. Shaft 32 is externally splined adjacent its rearward edge, as shown at 33, in order to cooperate with a correspondingly splined clutch member 34 which is slidably mounted thereon, and which is provided with a suitable friction surface 35 adapted to be brought into operative engagement with the side of the sprocket member 31. A spring 36 is mounted on shaft 32 between the clutch member 34 and a ring 37 fixed on the shaft 32 in any suitable manner, so as normally to maintain the friction surface 35 out of contact with the sprocket member 31.

The tubular shaft 32 is splined internally as indicated at 38, and a pair of driving members in the form of oppositely threaded half-nut members 39 and 40 (Figs. 5 to 10) are mounted within the shaft 32 and are adapted to slide axially on the splines 38. A tubular extension 41 has a screw threaded connection with the rearward end of shaft 32, and forms at its inner end an abutment which limits the travel of the half-nut members in a rearward direction. An anti-friction bearing 42 is mounted on the extension 41, being retained thereon in any suitable way as by means of the threaded collar 43, and is retained in a seat 44 in the cover 45 of the housing by means of an annular ring 46 attached to the inner side of the cover 45 by suitable means such as cap screws 47.

Mounted within the two half-nut members 39 and 40, and extending axially therebeyond is a driven member in the form of a multi-thread screw member 49 having both right hand and left hand threads that engage with the nut members 39 and 40. The screw member 49 is adapted to extend outwardly through an opening 50 in the forward end of casing 25, and is non-circular in cross section at 49′ where it extends through the opening in the casing so that the screw member is free to slide axially but is prevented from rotating. Beyond the portion 49′ the screw member 49 is formed with a reduced cylindrical extension 79.

An extension 51 is threaded within the rearward end of the screw shaft 49 and extends outwardly through an opening in the cover 45, and a spring 52 is mounted on said extension between a head 53 on the end of extension 51 and a suitable thrust collar 54 on the outside of cover 45, the arrangement being such that the screw shaft 49 with the nuts 39 and 40 thereon is normally held in a retracted position, with the nuts bearing on the end of abutment member 41.

A lever 55 is universally fulcrumed at its lower end to the cover 45 of the housing in any suitable manner as by means of a stud 56 fixed in the cover 45 and provided with a spherical surface against which the lower end of the lever is constantly pressed by a spring 57 on the stud. The lever 55 is formed, as shown more particularly in Figs. 4 and 11 of the drawings, to straddle the extension 51 of screw shaft 49, and is provided substantially in the horizontal plane of such extension with a pair of pockets 58 and 59 (Fig. 11) adapted to receive a pair of thrust pins 60 and 61 which are slidably mounted in the cover 45 on each side of the screw shaft 49. The thrust pins 60 and 61 are adapted to bear against the rear face of a thrust bearing 62 mounted on the sliding clutch member 34 and slidable in a seat 69 in the ring 46. The pressure of the thrust pins 60 and 61 on the thrust bearing 62 controls the engagement of the friction surface 35 of clutch member 34 with the clutch surface on the side of sprocket member 31.

The upper end of lever 55 is provided with an opening through which a threaded stud 63 is adapted to pass with clearance for slight universal movement, and the stud 63 is maintained in adjusted position therein by suitable means such as the nut 64 threaded on one end thereof and having a spherical surface adapted to cooperate with a similar concave surface on lever 55. A tension spring 65 is attached to the other end of stud 63, and is connected to a foot pedal 66 in any suitable way as by means of yoke member 67.

The foot pedal 66 is loosely journaled on cross shaft 15 instead of being fixed thereto as in the ordinary construction, and is prevented from sliding endwise thereon by suitable means such as a thrust collar 68 on one side, and operating crank arm 70 on the other. The operating crank arm 70 is rigidly fixed to shaft 15 in any suitable manner, and is provided on its end with a thrust block 71. A thrust shaft 72 is slidably mounted in the body of housing 25 in operative relation to the thrust block 71 and parallel to the screw shaft 49 as shown in Figs. 1 and 2. Shaft 72 is adjustably connected to the screw shaft by suitable means such as the collar member 73 which is fixed to the extension 79 of the screw shaft as by pin 79′, and adjustably connected to the shaft 72 as by set screw 73′. The thrust shaft 72 may thus be adjusted to abut the thrust block 71 and then be fixed to the screw shaft 49 to move in unison therewith.

The foot pedal 66 is provided with an offset arm 74 which is normally positioned at the rear of the operating arm 70 and slightly spaced therefrom.

Housing 25 may be provided with a suitable oil filler and inspection opening such as indicated at 75, and an oil drain as at 76, and may have suitable oil-retaining felt rings such as 77 and 78 to prevent the escape of oil around the extension 51 and the screw shaft 49, respectively.

In operation, when the vehicle is in motion, sprocket wheel 31 is constantly rotated by the chain 28 from the sprocket wheel 27 on the shaft 13, but the clutch member 34 is normally maintained out of contact with the friction surface on sprocket member 31 so that the sprocket rotates idly without imparting its motion to any of the brake operating mechanism. When it is desired to apply the brakes, a slight pressure on the foot pedal 66 will draw the floating lever 55 forward by means of spring 65, and the pins 60 and 61 will be pushed inwardly with a balanced pressure due to the universal mounting of lever 55. The clutch member 34 is thus caused to engage the sprocket surface 31 with an even and uniform pressure which is proportional to the pressure applied to the foot pedal. The frictional engagement of the clutch member 34 with the sprocket member 31 causes a rotation of the clutch member which is imparted through the splines 33 to the hollow shaft 32 and the nut members 39 and 40 splined therein. Inasmuch as the screw shaft 49 is prevented from rotation by its non-circular engagement in the opening 50 of housing 25, rotation of the nut members 39 and 40 will cause relative longitudinal movement between the nut members and the screw member, the nut members moving in opposite directions on the screw member by reason of their opposite threads. Since rearward motion of the nut members 39 and 40 is prevented by the end of the tubular extension 41, it will be seen that the screw shaft 49 will be displaced longitudinally by the action of one or the other of the nut members 39 or 40, depending on the direction of rotation of the sprocket member 31. This movement of screw shaft 49 is imparted through the thrust shaft 72 to the thrust block 71 on lever 70, and thus swings the cross shaft 15 in a direction to apply the brakes of the vehicle.

Since the force exerted by thrust shaft 72 is a function of the wedging action of the nut member on the screw shaft, and since this wedging action is a function of the frictional engagement of clutch member 34 on sprocket member 31, it will be seen that the brake applying force exerted by the power operating mechanism is in approximately direct proportion to the force exerted on the foot pedal, the multiplying factor being determined by the design and proportion of the parts of the power operating mechanism.

It will be noted, particularly by reference to Figs. 5 to 10 of the drawings, that this mechanism operates equally well whether the vehicle is moving forward or backward. Thus Figs. 5 and 8 represent the mechanism in its off position with the nut members 39 and 40 resting against the tubular extension 41. Figs. 6 and 9 represent the position of the parts when the brakes are applied as the vehicle is moving forward and the nut members are rotated in a clockwise direction. The nut member 39, having a right hand thread, wedges against the tubular member 41 and forces the screw shaft 49 forwardly, while the nut member 40, which is provided with a left hand thread, is carried forward with shaft 49 and also moves forward thereon into the position illustrated. Figs. 7 and 10 illustrate the position of the parts when the brakes are applied as the vehicle is moving backward and the nut members are rotated in a counter-clockwise direction. In this case the left hand nut member 40 wedges against the tubular member 41, thus forcing the screw shaft 49 forwardly to apply the brakes, while the right hand nut member 39 moves forward idly therewith and thereon. The pitch of the cooperating threads on the screw and nut members is so selected that when the foot pedal is released and the clutch member 34 is moved out of engagement with the sprocket 31 by the spring 36, the screw shaft 49 will be retracted to its normal position by spring 52, and the nut member 39 or 40, as the case may be, will be simultaneously returned to its normal position.

The connecting spring 65 is wound with a considerable initial tension, so that it acts normally as an inextensible connecting link between the foot pedal and the floating lever 55. However, should the power operating mechanism fail to function for any reason, or should it be desired to apply the brakes when the vehicle was not in motion, a slight additional pressure upon the foot pedal 66 will cause the spring 65 to yield and allow the offset arm 74 on the foot pedal to come into engagement with the rear of the operating crank 70 and operate the brakes in the conventional manner.

It will be noted that although this invention has been illustrated in conjunction with a four-wheel braking system, it is equally applicable to other pedal operated braking systems by suitably connecting the power operating device to the pedal shaft as herein shown and described.

Although but one embodiment of the invention has been shown and described in detail, it is to be expressly understood that the illustrated embodiment is not exclusive, and various other embodiments will now suggest themselves to those skilled in the art, while changes may be made in construction, arrangement and proportions of parts, and certain features used without other features, without departing from the spirit of the invention. Reference is therefore to be had to the claims hereto appended for a definition of the limits of the invention.

What is claimed is:

1. A brake operating mechanism including a pair of driving members, a driven member, means under the control of the operator for moving the driven member by causing relative rotation between the driving and driven members, and connections between the driven member and the brakes whereby motion of the driven member will operate the brakes.

2. A brake operating mechanism including a pair of driving members, a driven member, means under the control of the operator for moving the driven member in one direction by causing relative rotation between the driving and driven members in either direction, and connections between the driven member and the brakes whereby motion of the driven member in said one direction will operate the brakes.

3. A brake operating mechanism including a pair of driving members, a driven member, means whereby relative rotation between the driving and driven member causes opposite relative longitudinal movement of the driving members with respect to the driven members, means for preventing longitudinal movement of the driving members in one direction from their normal position, and connections whereby longitudinal movement of the driven member in the opposite direction will operate the brakes.

4. A brake operating mechanism including a pair of driving members, a driven member, means under the control of the operator for causing relative rotation between the driving and driven members, means whereby such relative rotation causes opposite relative longitudinal movement of the driving members with respect to the driven member, means for preventing longitudinal movement of the driving members in one direction from their normal position, and connections whereby longitudinal movement of the driven member in the opposite direction will operate the brakes.

5. In a brake operating mechanism for vehicles and the like, a rotatable power member, a reciprocable driven member, a pair of driving members adapted to receive rotary motion of low torque from the power member and cooperating with the driven member to thereby cause longitudinal movement of great force of the driven member, manually controlled variable torque transmitting means between the power member and the driving members, and connections between the driven member and the brakes to operate the latter.

6. In a brake operating mechanism for vehicles, a rotatable power member, a reciprocable driven member, a pair of intermediate driving members adapted to receive rotary motion from the power member and cooperating to move the driven member longitudinally in one direction in response to rotation of the power member in either direction, manually controlled variable torque transmitting means between the power member and the driving members, and connections between the driven member and the brakes to operate the latter.

7. In a brake operating mechanism, a force multiplying unit including a reversely threaded screw and coacting nut elements, means for restraining the rotation of said screw element, means under the control of the operator for rotating the nut elements from a rotating part, and means restraining longitudinal movement of said nut elements in one direction.

8. In a brake operating mechanism, a force multiplying unit including reversely threaded screw and nut elements, means under the control of the operator for rotating said nut elements from a rotating part, means restraining longitudinal movement of said nut elements in one direction, means restraining rotation of the screw element, and connections between the screw element and the brakes to operate the latter.

9. In a power brake operating unit for vehicles, an operating member driven from a rotating part of the vehicle, a manually controlled clutch member adapted to be driven thereby, a pair of reversely threaded nut members splined to the clutch member, a reversely threaded non-rotatable shaft cooperating with said nut members, and an abutment preventing longitudinal movement of said nut members in one direction whereby rotary motion of the nut members in either direction from their normal position will move the shaft longitudinally in one direction.

10. A power brake operating unit for vehicles comprising an operating member driven from a rotating part of the vehicle, a force multiplying unit, a friction clutch for connecting the operating member to the force multiplying unit, laterally spaced clutch actuating means, and a universally mounted manually operated lever adapted to apply a balanced pressure on the clutch actuating means.

11. In combination with the change speed transmission and drive shaft of a motor vehicle, a power brake operating unit adapted to be mounted substantially parallel to the transmission casing and to be driven from the drive shaft, and a casing for said power unit having an integral off-set portion adapted to house the driving connection between the drive shaft and the power brake unit and formed to fit the end of the change speed transmission casing, and means for rigidly attaching said portion to said transmission casing.

12. In a brake operating mechanism, a force multiplying unit including a nonrotatable, longitudinally displaceable screw shaft, a nut coacting therewith, means for rotating said nut and limiting the longitudinal travel thereof, brake mechanism, and connections between said shaft and said mechanism.

13. In a power brake operating mechanism, a force multiplying unit including a nonrotatable, longitudinally displaceable screw shaft, a nut coacting therewith, means for restraining longitudinal travel of the nut in one direction, means under the control of the operator for rotating said nut, brake mechanism and operative connections between said shaft and said brake mechanism.

14. In a power brake operating mechanism, a force multiplying unit including a nonrotatable, longitudinally displaceable screw shaft, a pair of oppositely threaded nuts coacting therewith, means for restraining longitudinal travel of the nuts in one direction, means under the control of the operator for rotating said nuts, brake mechanism, and operative connections between said shaft and said brake mechanism.

15. In a power brake operating mechanism for motor vehicles, a driving member adapted to be driven from a rotating part of the vehicle, three cooperating threaded members coaxial therewith, variable torque means under the control of the operator for rotating the outer of said coaxial members from the driving member, means for restraining the rotation of the inner of said coaxial members, and means whereby the resultant relative longitudinal movement of the coaxial members is caused to apply the brakes.

16. In a power brake operating mechanism for motor vehicles, a driving member adapted to be driven from a rotating part of the vehicle, three cooperating oppositely threaded members coaxial therewith, variable torque means under the control of the operator for positively rotating the outer of said coaxial members from the driving member, means for restraining the rotation of the inner of said coaxial members and means whereby the resultant longitudinal movement between the rotated and restrained members in either direction of rotation is caused to apply the brakes.

17. In a power brake operating mechanism for motor vehicles, a driving member adapted to be driven from a rotating part of the vehicle, three cooperating oppositely threaded members coaxial therewith, means including a friction clutch under the control of the operator for positively rotating the outer of said coaxial members from the driving member, means for restraining the rotation of the inner of said coaxial members, abutments preventing longitudinal movement of the coaxial members in one direction from their normal position whereby relative rotation in either direction of said coaxial members causes one thereof to be moved in the opposite direction, and connections between said moved member and the brakes to operate the latter.

In testimony whereof I have signed this specification.

FREDERICK HATHAWAY RAGAN.